Jan. 20, 1953     E. A. ARP     2,625,749

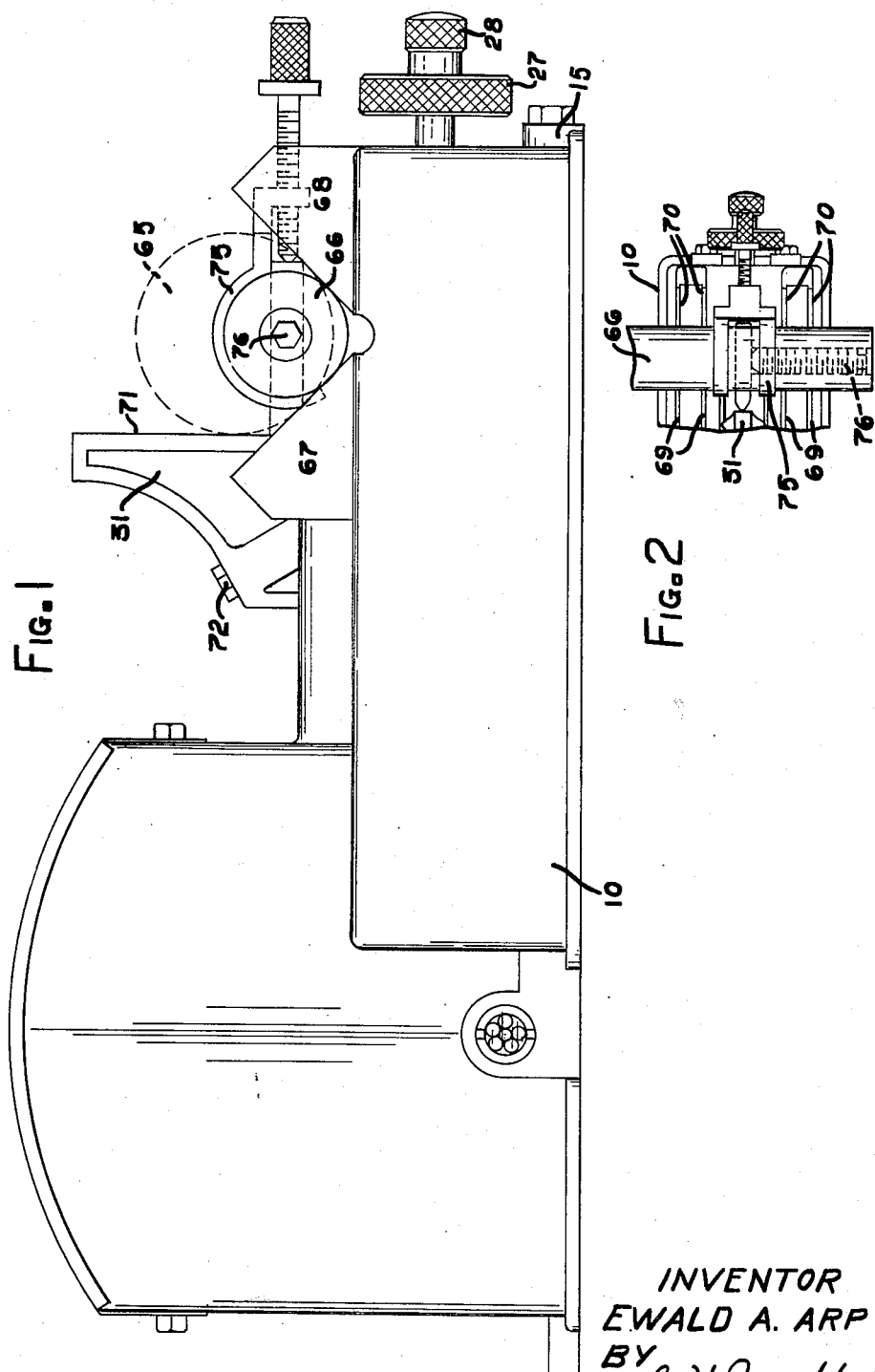

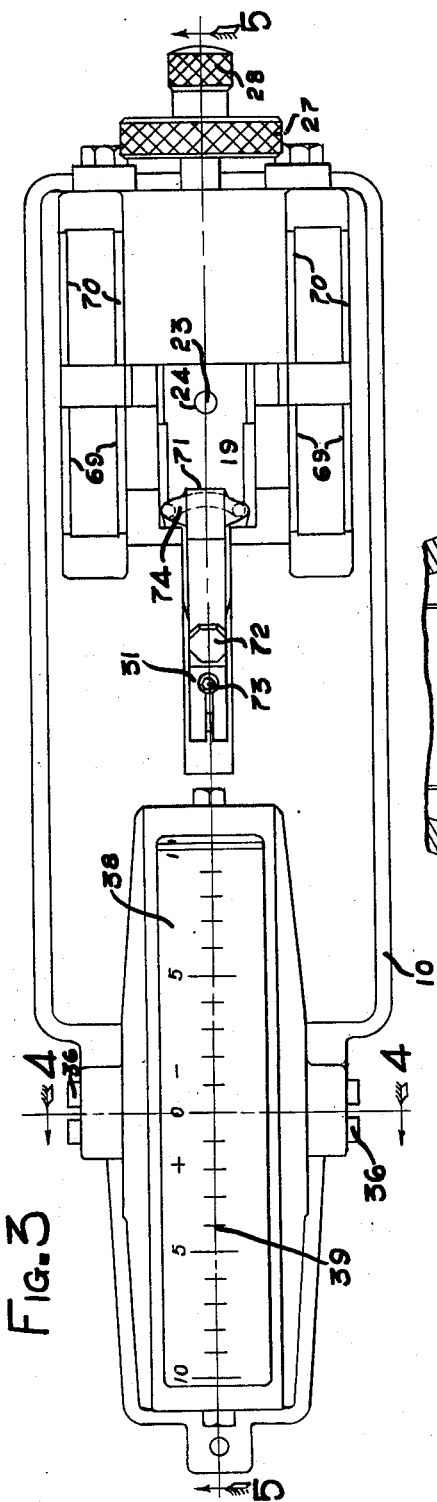

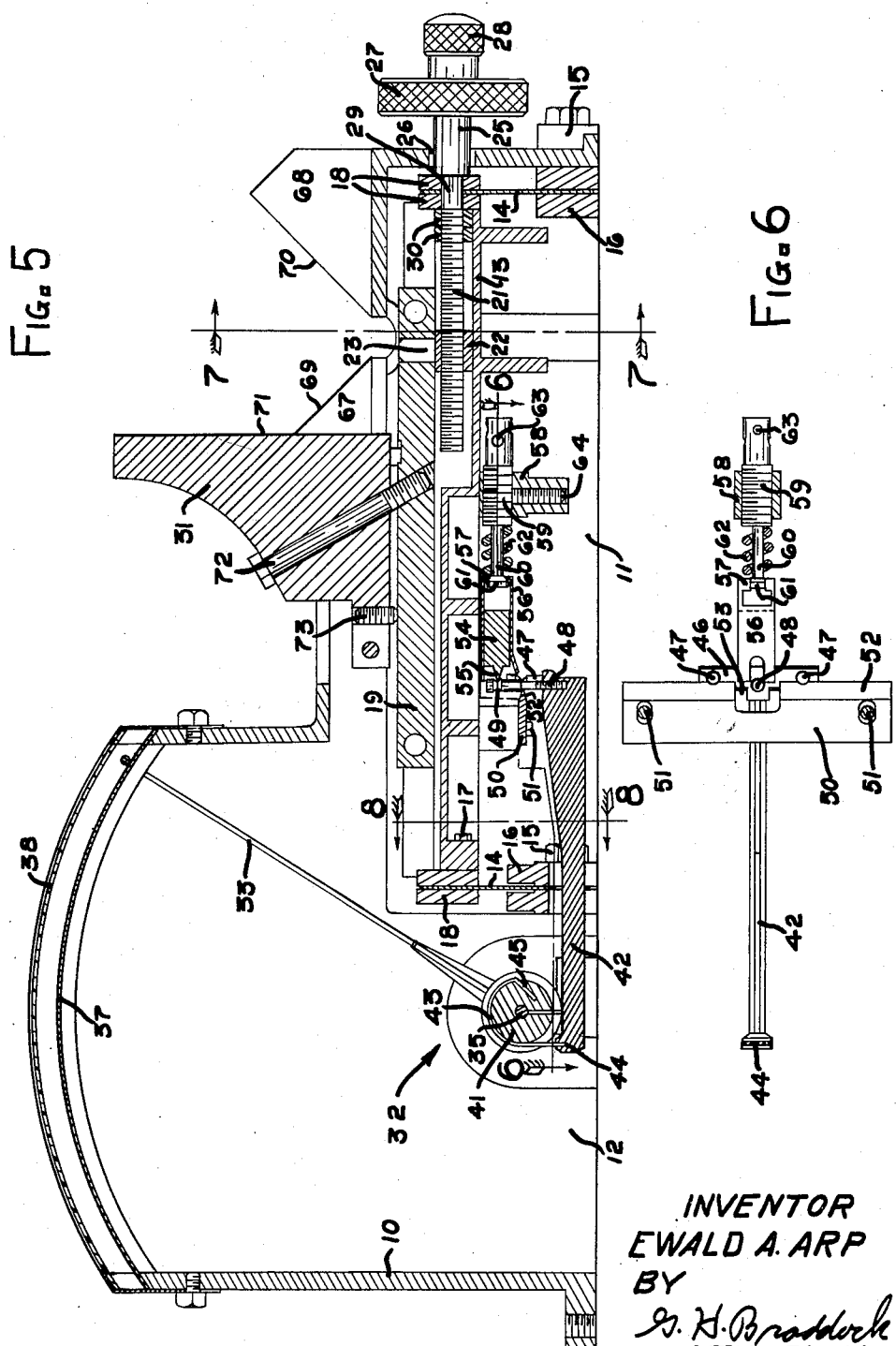

COMPARATOR FOR COLLOCATING A CUTTER IN A BORING BAR

Filed June 10, 1948     4 Sheets-Sheet 4

INVENTOR
EWALD A. ARP
BY G. H. Braddock
ATTORNEY

Patented Jan. 20, 1953

2,625,749

UNITED STATES PATENT OFFICE 2,625,749

COMPARATOR FOR COLLOCATING A CUTTER IN A BORING BAR

Ewald A. Arp, Minneapolis, Minn., assignor to Tobin-Arp Manufacturing Company, Minneapolis, Minn., a corporation of Minnesota Application June 10, 1948, Serial No. 32,231

8 Claims. (Cl. 33—185)

This invention has relation to a comparator.

An object of the invention is to provide a new and improved apparatus adapted to be employed for the purpose of setting a cutting tool in a boring bar by comparison with or reference to a shaft to be capable of producing an internal bearing surface of diameter having direct relation to the diameter of said shaft.

A further object is to provide a new and improved comparator which will include a construction and arrangement for selectively receiving a shaft or a boring bar with cutting tool and an instrument capable of measuring and denoting the radius of each of said shaft and said boring bar with cutting tool, the one with respect to the other, in such manner that the boring bar with cutting tool can be accurately set to have precisely the same radius as said shaft or to have any radius which may be predetermined, greater or less than the radius of said shaft.

A further object is to provide a new and improved comparator by employment of which the setting of a cutting tool in a boring bar can be accomplished with great accuracy.

A further object is to provide a comparator wherein will be incorporated various desirable and improved features and characteristics novel both as individual entities of the comparator and in combination with each other.

And a further object is to provide a comparator which will be of construction and operative in the manner as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

In the accompanying drawings forming a part of this specification,

Fig. 1 is a side elevational view of a comparator made according to the invention;

Fig. 2 is a fragmentary plan view, on a reduced scale, detailing features of said comparator;

Fig. 3 is a plan view of the comparator;

Fig. 4 is an enlarged vertical transverse sectional view, taken on line 4—4 in Fig. 3;

Fig. 5 is a vertical longitudinal sectional view, taken on line 5—5 in Fig. 3;

Fig. 6 is a horizontal longitudinal sectional view, taken as on line 6—6 in Fig. 5;

Figure 7:
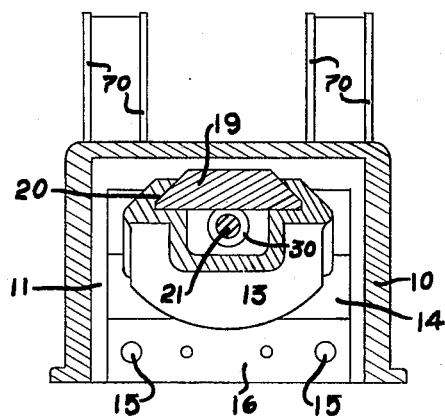
Fig. 7 is a vertical transverse sectional view, taken as on line 7—7 in Fig. 5.
Figure 8:
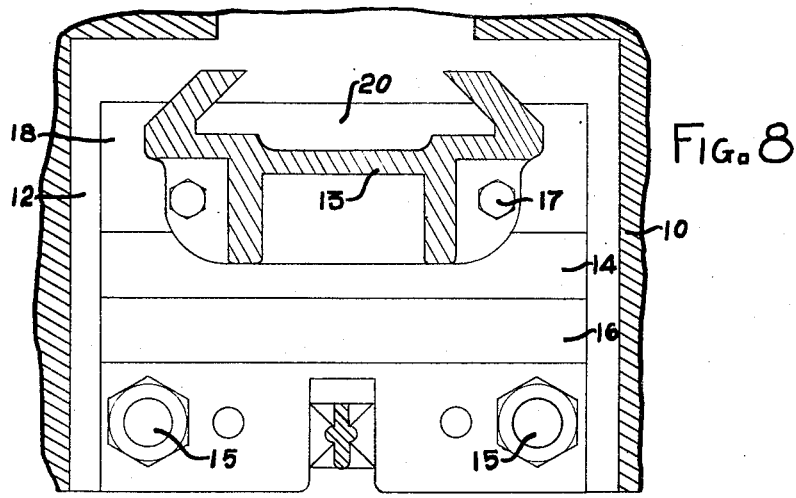
Fig. 8 is an enlarged vertical transverse sectional view, taken as on line 8—8 in Fig. 5.

A frame 10 of the comparator, adapted to be supported upon and secured to a horizontal surface, is constituted as upper, side and end walls providing a relatively shallow, rectilinear concavity 11 at one end of said frame and a comparatively deep, rectilinear concavity 12 at the opposite end of the frame contiguous with the concavity 11. The concavities 11 and 12 are in alined relation in direction longitudinally of the frame 10, and, in the disclosure as made, said frame is open at its lower portion.

A horizontally disposed actuator member 13 is situated in an upper portion of the concavity 11 and projects into an intermediate part of a portion of said concavity 12 adjacent said concavity 11, and said actuator member 13 is supported by the frame 10 for limited, resilient movement longitudinally of said frame.

Resilient and flexible elements supporting the actuator member 13 are constituted as thin, flat plates, each denoted 14, at opposite ends of said actuator member. The thin, flat plates 14, 14 extend transversely of the frame 10 and lower marginal portions thereof are rigidly secured, as at 15, to said frame between transversely extending blocks, each indicated 16, adjacent a lower portion of the frame. The opposite ends of the actuator member 13 are secured, as at 17, to upper marginal portions of the thin, flat plates 14, 14 through the instrumentality of transversely extending blocks, each indicated 18, between which said upper marginal portions of said thin, flat plates are situated. The construction and arrangement are such that said actuator member is mounted within the frame 10 for limited, resilient, to and fro movement longitudinally of said frame while the actuator member is disposed substantially in a horizontal plane.

The actuator member 13 is constituted as an elongated platform or table which supports a horizontally disposed, elongated actuator element 19 in such manner that said actuator element is capable of adjustment longitudinally of said actuator member, as well as longitudinally of the frame 10. As shown, an upper portion of the actuator member 13 is constructed to provide a horizontal, longitudinally extending guideway 20 in which the actuator element 19 is slidably arranged.

Mechanism for accomplishing longitudinal adjustment of said actuator element 19 relative to said actuator member 13 includes a horizontally disposed, longitudinally extending, externally threaded rod 21 situated within the actuator member and engaged with an internal thread of a nut 22 through which said externally threaded rod passes. The nut 22 integrally supports a lug 23 which extends upwardly into and snugly fits an opening 24 in the adjacent end portion of the actuator element 19. A head 25, integral with the externally threaded rod 21 and passing freely through an opening 26 in the end wall of the frame 10 opposite the concavity 12, also is integral with large and small manipulating knobs, represented 27 and 28, respectively, situated exteriorly of said frame. A reduced portion 29, connecting the externally threaded rod 21 with the head 25, passes through and is rotatably supported by the transversely extending blocks 18, 18 and the thin, flat plate 14 at the corresponding end of the frame, and lock nuts 30, at the interior side of and engaged with the block 18 which is adjacent said lock nuts, retains the interior end of the head 25 engaged with the block 18 which is adjacent said head thus to preclude longitudinal movement of said externally threaded rod 21 relative to the actuator member 13. It will be apparent that the actuator element 19 can be adjusted longitudinally of said actuator member 13 by rotative movement of either of the manipulating knobs. The small manipulating knob 28 of course is more suitable for use to the accomplishment of quick adjustment of said actuator element, and the large manipulating knob 27 is more appropriate for use when the actuator element is to be accurately adjusted. Also it will be apparent that the frame 10 will offer no interference to longitudinal movement of the head 25, together with the actuator member 13 and the actuator element 19 as a unit, inasmuch as said head 25 is in clearing relation to the opening 26.

The actuator element 19 is constituted as an elongated platform or table which supports a vertically disposed actuator 31 in such manner that said actuator is capable of adjustment relative to said actuator element in several different directions to the accomplishment of a purpose or result as hereinafter to be set forth.

The actuator 31, while rigid with the actuator element 19, is adapted to be moved longitudinally of the frame 10, toward the left in Figs. 1, 3 and 5 of the drawings, thus to cause said actuator element 19 and the actuator member 13 to be moved longitudinally in the same direction, against resilient action of the thin, flat plates 14, and in turn cause a measuring and denoting instrument 32 of the comparator to be operated.

An indicating element 33, of inverted U-shape as shown, is fixedly supported, as at 34, on a horizontally disposed, transversely extending shaft 35 situated in a lower portion of the concavity 12 and having its opposite end portions rotatably mounted, as at 36, 36 in the side walls of the frame 10. Spaced apart legs of the U-shape indicating element 33 are disposed at opposite sides of an arc shape dial 37 supported by said frame 10, and the base of the U of said indicating element is situated above said dial to be movable thereover beneath a transparent cover 38. The upper surface of the dial 37 is calibrated, as indicated at 39, to denote small fractions of an inch, as, for example, one-thousandths of an inch, or other desired measurement. As disclosed, zero on the dial is situated at its midlength between positive indications at the left and negative indications at the right. A coil spring 40, within the concavity 12 and surrounding the shaft 35, is for normally retaining the indicating element 33 situated, about as in Figs. 3 and 5, to indicate a negative calibration.

A spool 41, fixed on the transverse shaft 35 at a location between the legs of the U-shape indicating element 33, is adapted to be rotated against resilient action of the coil spring 40 to cause said indicating element to be moved relative to the dial 37, toward the left in Figs. 3 and 5, in direction away from the negative toward the positive calibrations on said dial.

A horizontal actuator bar 42, for imparting rotative movement to the spool 41, in counterclockwise direction as shown, includes a rearward end portion situated directly beneath said spool connected therewith by a ribbon or flexible strap 43 which extends upwardly from the adjacent end of said actuator bar along the side of the spool which is opposite the concavity 11, thence along the upper side of said spool and thence along an upper part of the side of the spool which is adjacent said concavity 11. The end of the ribbon or flexible strap 43 adjacent the actuator bar 42 is secured thereto as at 44, and the opposite end of said ribbon or flexible strap is secured as at 45 to the spool 41. The construction and arrangement are such that longitudinal movement imparted to the horizontal actuator bar 42 in direction toward the concavity 11, to the right in Fig. 5 of the drawings, will cause the indicating element 33 to be swung in direction away from said concavity 11, to the left in said Fig. 5, against resilient action of the coil spring 40, and also such that said coil spring will return said indicating element to its normal position, as in Figs. 3 and 5, upon release of said actuator bar.

The actuator bar 42 extends forwardly longitudinally of the frame 10, and a forward end portion of said actuator bar projects into a lower part of the adjacent portion of the concavity 11 beneath a rearward end portion of the actuator member 13. A lower central portion of the thin, flat plate 14 at the rearward end of said actuator member 13 is cut away to be in clearing relation to the actuator bar.

The forward end portion of the actuator bar 42, or end portion of said actuator bar spaced from the spool 41, rigidly supports a crosshead 46 itself supporting spaced apart upstanding pins, represented 47, 47, in alined relation in direction transversely of the frame 10 and also supporting an upstanding pin 48 between and equally spaced from and situated slightly to the rear of the upstanding pins 47, 47. As shown, the upstanding pins 47, 48, 47 are in perpendicular relation to the actuator bar 42 and its crosshead 46, and each of said upstanding pins includes a horizontally disposed V-notch 49 situated in spaced relation to the crosshead. The V-notches 49 extend throughout the full circumferences of the upstanding pins, the V-notches in the upstanding pins 47, 47 are in horizontal alinement, and the V-notch in the upstanding pins 48 is at elevation above that of said V-notches in said upstanding pins 47, 47. The V-notches provide, together with reduced portions of the upstanding pins which said V-notches produce, pivotal supports for a purpose to be made plain.

A horizontal lower pivot blade 50, at the rear of the upstanding pins 47, 47 and adjustably, rigidly supported, as at 51, in any suitable and convenient manner upon a fixed part of the frame 10, includes a transversely extending knife edge 52 engaged in the V-notches 49 of said upstanding pins 47, 47 and an intermediate portion of said knife edge 52 is cut away, as at 53, to be in clearing relation to the upstanding pin 48.

The upstanding pins 47, 48, 47, rigid with the crosshead 46, together constitute a structure having an intermediate portion thereof mounted upon the pivot blade 50 and first and second end portions thereof disposed at opposite sides of said pivot blade.

A horizontal upper pivot blade 54, at the front of the upstanding pin 48 and supported in a manner to be described, includes a transversely extending knife edge 55 engaged in the V-notch 49 of said upstanding pin 48 at a side thereof directly opposite the knife edge 52.

The horizontal upper pivot blade 54 is rigidly supported by a horizontal retainer 56 which in the present disclosure is constituted as a strap of rigid metal bent upon itself. The transversely extending knife edge 55 projects beyond the rear end of the retainer 56, and the front end of said retainer includes a transeverse wall 57, in spaced relation to said upper pivot blade 54, having an opening therethrough. The retainer 56 extends forwardly from the pivot blade 54 which it supports in alined relation to said pivot blade in direction longitudinally of the frame 10, and the actuator bar 42 is parallel with said retainer in direction longitudinally of said frame.

The horizontal retainer 56 is secured to the actuator member 13 through the medium of a nut 58 rigid with and extending downwardly from a lower surface of said actuator member. A horizontal adjusting screw 59, disposed forwardly of and in longitudinally alined relation with said retainer 56, includes an external thread engaged with an internal thread of the nut 58, a reduced shank 60 extending rearwardly from the rearward end of said adjusting screw passed rearwardly through the opening in the transverse wall 57 of the retainer 56, a head 61 rigid with said shank and disposed within said retainer, between the pivot blade 54 and said transverse wall 57, connects the shank and the retainer to each other, and a compression coil spring 62 upon said shank and between the transverse wall 57 and the rearward end of said adjusting screw 59 normally retains said transverse wall in engaged relation with the head 61 thus to retain said head in spaced relation to the pivot blade 54. Small holes in the adjusting screw 59, for receiving a wrench, are denoted 63, and a locking screw 64 in the nut 58 is for fastening said adjusting screw 59 in set position. The adjustable connection between the nut 58 and the pivot blade 54 is included to the end that said pivot blade can be set at intended and proper relation to the pivot pin 48, and the resilient connection between said nut and said pivot blade 54, provided by the compression coil spring 62 in cooperation with other elements, is included with the end in view of protecting delicate elements of the measuring and denoting instrument 32. The compression coil spring 62 will be constructed to have strength sufficient to transmit, without collapsing, force steadily applied to the nut 58 to cause the pivot blade 54 to be actuated, moved toward the left in Fig. 5, but the strength of said compression coil spring will be insufficient to cause force violently applied to said nut 58 to be transmitted to said pivot blade. Stated otherwise, the compression coil spring 62 will become collapsed, by reason of inertia of parts of the instrument 32 to be operated, in response to force violently applied to the nut 58, thus to protect said instrument parts from damage.

The pivot blade 54 will be moved to the left in Fig. 5, in response to movement of the actuator 31 toward the left, through the medium of the actuator element 19, the actuator member 13, the nut 58, the adjusting screw 59, the compression coil spring 62 and the retainer 56. Movement toward the left of said actuator member 13 will be opposed by the resilient and flexible elements 14, 14, and upon release of said actuator 31, said resilient and flexible elements will return the actuator member, together with the pivot blade 54 as a unit, to its normal position, thus to permit the coil spring 40 to return the indicating element 33 to its normal position. Movement of the pivot blade 54 in direction toward the concavity 12, to the left in Fig. 5, will cause the upstanding pin 48 to be moved in the same direction, the movement applied to said upstanding pin 48 will cause the upstanding pins 47, 47 to be swung in corresponding direction, and swinging movement of said upstanding pins 47, 47, of course upon the transversely extending knife edge 52 as an axis, will cause the actuator bar 42 to be moved in direction toward the concavity 11, to the right in Fig. 5. Upon release of said pivot blade 54, the upstanding pins 47, 48, 47 will assume their normal positions, about as disclosed in said Fig. 5.

The comparator incorporates a construction and arrangement, including the vertically disposed actuator 31 as part thereof, for selectively receiving a shaft, such as a wrist pin, denoted 65 in Fig. 1, or a boring bar with cutting tool, represented 66 in Figs. 1 and 2, adapted to be operative in conjunction with the measuring and denoting instrument 32 to the end that said cutting tool can be accurately set in said boring bar so that the boring bar with cutting tool can have overall radius precisely the same as that of said shaft, or can have radius greater or less than that of the shaft, as may be predetermined. Stated more broadly, the comparator is capable of employment for the purpose of setting a cutting tool in a boring bar to have overall radius bearing direct relation to the radius of a shaft, either equal to, or greater than or less than the shaft radius, regardless of the cross sectional dimension of said shaft.

The upper wall of the frame 10 integrally or rigidly supports upstanding pieces, indicated 67 and 68, respectively, which provide spaced apart, obliquely disposed engaging surfaces, represented 69 and 70, respectively, which face and extend downwardly toward each other. All of the engaging surfaces 69 and 70 are at the same angular relation to a vertical plane passed transversely through the frame 10 at a location between lower end portions of said engaging surfaces 69 and 70, and all of the engaging surfaces 69 are in a single plane extending transversely of said frame, as are also all of the engaging surfaces 70. And, too, the vertically disposed actuator 31 is disposed at the side of lower portions of the oblique engaging surfaces 69 and 70 adjacent to the concavity 12, as well as in adjacent relation to said lower portions of said engaging surfaces. As shown, the vertically disposed actuator 31 is situated at the transverse center of the frame 10 and there are engaging surfaces 69 and 70 at either side of said vertically disposed actuator.

That is to say, there are two engaging surfaces 69 and two engaging surfaces 70 at each of the opposite sides of the vertically disposed actuator 31 in the disclosure as made. The engaging surfaces 69 and 70, respectively, are at an angular relation to each other of about 90 degrees. This need not, however, be the case. All that is necessary is that the oppositely disposed engaging surfaces extend downwardly toward each other at equal angle to a plane passed transversely through the frame 10 in perpendicular relation to its longitudinal axis, and that all of the engaging surfaces of each set lie in a single plane.

The oppositely disposed engaging surfaces 69 and 70 are for supporting a shaft in the manner the shaft 65, disclosed in dotted lines in Fig. 1, is supported. That is, a shaft with reference to which a boring bar with cutting tool, such as 66, is to be set, as well as the boring bar, is supported upon the engaging surfaces 69 and 70 in such manner that oppositely disposed parts of the cylindrical surface of said shaft and said boring bar engage all of said engaging surfaces 69 and 70 in the accomplishment of operation of the comparator in practice. It will be manifest that a plane passed longitudinally and diametrically through a shaft or boring bar so supported upon the engaging surfaces 69 and 70 and also passed through the frame 10 in perpendicular relation to its longitudinal axis will always be equidistantly spaced from the engaging surfaces 69 and 70, respectively, as well as at equal angle to said engaging surfaces, regardless of the actual diameter of said shaft or boring bar. Thus, the exact center of a shaft or boring bar supported by the engaging surfaces 69 and 70 will in each instance, independently of the diameter of the shaft or boring bar, be situated in a plane at fixed distance from and bearing precisely the same relation to each of the sets of engaging surfaces 69 and 70, at higher elevation in said plane in the instance of larger shafts and boring bars, and vice versa, and, obviously, since the sets of engaging surfaces 69 and 70 will locate the exact centers of shafts and boring bars of variable sizes supported thereon, throughout the full length of the shafts, in a single plane passed transversely through the frame 10 in perpendicular relation to its longitudinal axis, said sets of engaging surfaces will also bodily locate each supported shaft or boring bar so that it bears the same relation, except for size, to said mentioned single plane as does every other supported shaft.

The vertically disposed actuator 31 includes a vertically disposed engaging surface 71 which faces toward the engaging surfaces 69 and 70, and said vertically disposed actuator is adjustable upon the actuator element 19 to the end that said engaging surface 71 can be set in a vertical plane disposed transversely of the longitudinal axis of the frame 10.

As shown, an oblique screw 72 provides pivotal support for the actuator 31 upon the actuator element 19, a vertical screw 73 constitutes means for tilting said actuator in a vertical plane extending longitudinally of the frame 10, and a connection 74 between the actuator 31 and the actuator element 19 is provision for rotational adjustment of said actuator upon said actuator element.

It might be remarked that the comparator operates on the principle of measuring a radius and reading a diameter, and the measuring operation is performed by reference to the engaging surface 71 which is always disposed in a plane parallel with a plane passed longitudinally and diametrically through a supported shaft or boring bar transversely of the frame 10 in perpendicular relation to its longitudinal axis.

In practical operation of the comparator, a shaft such as 65 the radius of which is to be measured first will be supported upon the sets of engaging surfaces 69 and 70, and the actuator element 19 will be adjusted longitudinally of the actuator member 13 to cause the vertical engaging surface 71 to be situated at such relation to said engaging surfaces 69 and 70 that the indicating element 33 will be situated at zero calibration with said vertical engaging surface 71 engaged against said shaft. Then a boring bar with cutting tool, such as 66, will be supported upon said sets of engaging surfaces 69 and 70, and, finally, the cutting tool will be adjusted in the boring bar to cause the end of its working end portion to force the engaging surface 71 to position situating said indicating element 33 at zero calibration when said cutting tool is to produce an internal bearing surface of precisely the dimension of the shaft which was measured, or at a positive calibration when the fit of said shaft in its bearing is to be loose, or at a negative calibration when the fit of the shaft is to be tight. Of course, the vertically disposed actuator 31 and the parts which it operates will return to their normal positions upon each removal of a shaft or a boring bar from the apparatus.

An operating tool 75, disclosed in Figs. 1 and 2, conveniently may be employed to accomplish longitudinal adjustment of the cutting tool in direction toward the vertical engaging surface 71, and a locking screw 76, or some other suitable device, may be utilized to fasten said cutting tool in adjusted position.

Of course, the cutting tool will extend diametrically through the boring bar, and, as shown in Figs. 1 and 2, said cutting tool will be horizontally disposed during its adjustment.

It will be plain that inasmuch as the shaft and the boring bar are centered in the same vertical plane, parallel with the plane of the vertical engaging surface 71, the overall radius of a boring bar with cutting tool will be precisely the same as the radius of a shaft with reference to which the cutting tool is being set when the boring bar with cutting tool situates the indicating element 33 at the same location on the dial as does the shaft, as well as greater than the radius of said shaft to the extent denoted by said indicating element when said boring bar with cutting tool situates the indicating element at a positive calibration on said dial and less than the radius of the shaft to the extent denoted by said indicating element when the boring bar with cutting tool situates the indicating element at a negative calibration on the dial. In the instance of both a shaft and a boring bar with cutting tool to be set by comparison with or reference to said shaft, the distance between parallel planes, the one including the exact center of the shaft or boring bar, as the case may be, and the other including the vertical engaging surface, is a measurement which constitutes, at one and the same time, the radius of said shaft and the overall radius of said boring bar with cutting tool. When said mentioned distance is made the same for both the shaft and the boring bar with cutting tool, their radii, and hence their diameters, will be identical. When the mentioned distance is made greater for the boring bar with cutting tool than for the shaft, the radius of the former will be greater in proportion as the distance is made greater, and when said mentioned distance is made less for said boring bar with cutting tool than for said shaft, the radius of the former will be less in proportion as the distance is made less.

What is claimed is:

1. In an apparatus for employment to set a cutting tool in a boring bar to have overall radius bearing direct relation to the radius of a shaft, the combination with a device for selectively seating said shaft or said boring bar, of a movable actuator adjacent said device to be selectively engaged by said shaft while seated in said device or by said cutting tool while said boring bar is seated in said device thus to be moved way from the device, means for resiliently urging said actuator toward said device, an instrumentality operable in response to movement of said actuator away from said device against force of said means to measure and denote the radius of said shaft and the overall radius of said boring bar with cutting tool the one with respect to the other, a frame, a pivotal support upon said frame, a structure having an intermediate portion thereof mounted upon and first and second end portions thereof disposed at opposite sides of said pivotal support, a first operative connection between said mean and said first end portion, and a second operative connection between said instrumentality and said second end portion.

2. In an apparatus for employment to set a cutting tool in a boring bar to have overall radius bearing direct relation to the radius of a shaft, the combination with a device for selectively seating said shaft or said boring bar, of a movable actuator adjacent said device to be selectively engaged by said shaft while seated in said device or by said cutting tool while said boring bar is seated in the device, first means for resiliently urging said actuator toward said device, an instrumentality operable in response to movement of said actuator away from said device against force of said first means to measure and denote the radius of said shaft and the overall radius of said boring bar with cutting tool the one with respect to the other, a frame, a pivotal support upon said frame, a structure having an intermediate portion thereof mounted upon and first and second end portions thereof disposed at opposite sides of said pivotal support, second means for accomplishing adjustment of said actuator relative to said instrumentality and toward and away from said device, a first operative connection between said first means and said first end portion, and a second operative connection between said instrumentality and said second end portion.

3. In an apparatus for employment to set a cutting tool in a boring bar to have overall radius bearing direct relation to the radius of a shaft, the combination with a device for selectively seating said shaft or said boring bar, of a movable actuator adjacent said device with which either said shaft while seated in said device or said cutting tool while said boring bar is seated in said device is adapted to be engaged thus to cause said actuator to be moved away from the device, means for resiliently urging said actuator toward said device constituted as resilient and flexible members supporting the actuator for limited movement in direction transversely of said shaft and said boring bar while seated in said device, an instrumentality operable in response to movement of said actuator away from said device against force of said means to measure and denote the radius of said shaft and the overall radius of said boring bar with cutting tool the one with respect to the other, a frame, a pivotal support upon said frame, a structure having an intermediate portion thereof mounted upon and first and second end portions thereof disposed at opposite sides of said pivotal support, a first operative connection between said means and said first end portion, and a second operative connection between said instrumentality and said second end portion.

4. In an apparatus for employment to set a cutting tool in a boring bar to have overall radius bearing direct relation to the radius of a shaft, the combination with a device for selectively seating said shaft or said boring bar, of a movable actuator adjacent said device with which either said shaft while seated in said device or said cutting tool while said boring bar is seated in said device is adapted to be engaged thus to cause said actuator to be moved away from the device, first means for resiliently urging said actuator toward said device constituted as resilient and flexible members supporting the actuator for limited movement in direction transversely of said shaft and said boring bar when seated in said device, an instrumentality operable in response to movement of said actuator away from said device against force of said first means to denote the radius of said shaft and the overall radius of said boring bar with cutting tool the one with respect to the other, a frame, a pivotal support upon said frame, a structure having an intermediate portion thereof mounted upon and first and second end portions thereof disposed at opposite sides of said pivotal support, second means for accomplishing adjustment of said actuator relative to said instrumentality and toward and away from said device, a first operative connection between said first means and said first end portion, and a second operative connection between said instrumentality and said second end portion.

5. In an apparatus for employment to set a cutting tool in a boring bar to have overall radius bearing direct relation to the radius of a shaft, the combination with a device for selectively seating said shaft or said boring bar, of a movable actuator adjacent said device to be selectively engaged by said shaft while seated in said device or by said cutting tool while said boring bar is seated in said device thus to be moved away from the device, means for resiliently urging said actuator toward said device, an instrumentality, including an indicating element and a calibrated surface relative to which said indicating element is adapted to have movement, operable in response to movement of said actuator away from said device against force of said means to measure and denote the radius of said shaft and the overall radius of said boring bar with cutting tool the one with respect to the other, a frame, a pivotal support upon said frame, a structure having an intermediate portion thereof mounted upon and first and second end portions thereof disposed at opposite sides of said pivotal support, a first operative connection between said means and said first end portion, and a second operative connection between said instrumentality and said second end portion.

6. In an apparatus for employment to set a cutting tool in a boring bar to have overall radius bearing direct relation to the radius of a shaft, the combination with a frame and a device supported on said frame for selectively seating said shaft or said boring bar, of a movable actuator adjacent said device with which either said shaft or said cutting tool is adapted to be engaged thus to cause said actuator to be moved away from said device, means for resiliently urging said actuator toward said device constituted as resilient and flexible members supporting the actuator upon said frame for limited movement in direction transversely of said shaft and said boring bar when seated in said device, an instrumentality operable in response to movement of said actuator away from said device against force of said means to measure and denote the radius of said shaft and the overall radius of said boring bar with cutting tool the one with respect to the other, a pivotal support upon said frame, a structure having an intermediate portion thereof mounted upon and first and second end portions thereof disposed at opposite sides of said pivotal support, a first operative connection between said means and said first end portion, and a second operative connection between said instrumentality and said second end portion.

7. In an apparatus for employment to set a cutting tool in a boring bar to have overall radius bearing direct relation to the radius of a shaft, the combination with a frame and a device supported on said frame for selectively seating said shaft or said boring bar, of an actuator member, resilient and flexible elements supporting the actuator member upon the frame for limited, resilient movement transversely of said device, an actuator element upon and adjustable longitudinally of said actuator member and adjustable transversely of said device, mechanism for accomplishing longitudinal adjustment of said actuator element, an actuator upon said actuator element and adjacent said device with which either said shaft or said cutting tool is adapted to be engaged thus to cause said resilient and flexible elements to be flexed and said actuator, actuator element and actuator member to be moved transversely of said device, said resilient and flexible elements constituting means for resiliently urging said actuator toward said device, an instrumentality operable in response to movement of said actuator away from said device against force of said means to measure and denote the radius of said shaft and the overall radius of said boring bar with cutting tool the one with respect to the other, a pivotal support upon said frame, a structure having an intermediate portion thereof mounted upon and first and second end portions thereof disposed at opposite sides of said pivotal support, a first operative connection between said actuator member and said first end portion, and a second operative connection between said instrumentality and said second end portion.

8. The combination as specified in claim 7 wherein said first operative connection includes a collapsible, resilient element as part thereof.

EWALD A. ARP.

REFERENCES CITED

The following references are of record in the file of this patent:

UNITED STATES PATENTS

| Number | Name | Date |
|---|---|---|
| 283,627 | Logan | Aug. 21, 1883 |
| 1,279,703 | James | Sept. 24, 1918 |
| 1,400,331 | Turrettini | Dec. 13, 1921 |
| 1,413,232 | Miolla | Apr. 18, 1922 |
| 2,000,476 | Schmidt | May 7, 1935 |
| 2,107,558 | Zimmerman | Feb. 8, 1938 |
| 2,156,500 | Jeschor | May 2, 1939 |
| 2,177,399 | Aller | Oct. 24, 1939 |
| 2,181,077 | Street | Nov. 21, 1939 |
| 2,197,198 | Street | Apr. 16, 1940 |
| 2,208,635 | Johnson | July 23, 1940 |
| 2,449,842 | Cornell | Sept. 21, 1948 |

FOREIGN PATENTS

| Number | Country | Date |
|---|---|---|
| 64,062 | Denmark | Oct. 29, 1945 |
| 387,822 | Great Britain | Feb. 16, 1933 |
| 604,315 | Great Britain | July 1, 1948 |